United States Patent [19]

Humphrey

[11] 3,852,523

[45] Dec. 3, 1974

[54] CIRCUIT FOR COLOR TELEVISION RECEIVERS

[75] Inventor: John G. Humphrey, Chesapeake, Va.

[73] Assignee: General Electric Company, Portsmouth, Va.

[22] Filed: Apr. 9, 1973

[21] Appl. No.: 349,619

[52] U.S. Cl. .............. 178/5.8 A, 178/5.4 R, 333/75

[51] Int. Cl. .............................................. H04n 5/62

[58] Field of Search ........... 178/5.8 A, 5.8 R, 5.4 R; 333/75

[56] References Cited

UNITED STATES PATENTS

| | | | |
|---|---|---|---|
| 2,884,485 | 4/1959 | Shlachter | 178/5.8 A |
| 3,325,753 | 6/1967 | Shearer et al. | 333/75 |
| 3,549,796 | 12/1970 | Hoefgeest | 178/5.8 A |
| 3,562,411 | 9/1968 | Poppa | 333/75 |

*Primary Examiner*—Robert L. Griffin
*Assistant Examiner*—Marc E. Bookbinder

[57] ABSTRACT

A circuit is disclosed which provides high attentuation to undesired 4.5 MHz. signals which appear in the output of a video detector. A trap circuit causes no attenuation of the chrominance signals which occur at slightly lower frequencies than 4.5 MHz. The trap is located after the video detector at a location following an emitter follower stage that processes signals generated by the video detector. The desired passband response is obtained by selection of impedance values for the load supplied by the trap circuit.

3 Claims, 3 Drawing Figures

CIRCUIT FOR COLOR TELEVISION RECEIVERS

INTRODUCTION

This invention relates to color television receivers, and more particularly trap circuits utilized to prevent undesired sound signals from appearing in the luminance and chrominance circuitry of the color television receiver.

BACKGROUND OF THE INVENTION

In the transmission of color television signals from a transmitter to a receiver, present standards call for the transmission of both video and audio or sound signals within a set band of frequencies. A composite video signal, which includes luminance and chrominance components is modulated upon a video carrier frequency determined by the video transmitter and the audio signals are modulated upon an audio carrier frequency which differs from the video signal carrier frequency by 4.5 MHz.

At the color television receivers, the typical practice is to obtain a composite video signal which contains a luminance component and a chrominance component. These components are obtained by demodulation of the composite video signal in a video detector. The luminance component of the video signal occupies a band of frequencies approximately between 0 and 4 MHz. and the chrominance component of the video signal occupies a band of frequencies approximately between 3 to 4.2 MHz. In color television receivers, the incoming signal from a television transmitter is customarily first converted to an intermediate frequency (IF) signal wherein the sound carrier frequency is approximately 41.25 MHz. and the video carrier frequency is 45.75 MHz. It has been found that if the 41.25 MHz. sound carrier is insufficiently attenuated, the combination of the 41.25 MHz. sound carrier with the 45.75 MHz. video carrier signal produces a difference signal of 4.5 MHz. which difference signal is frequency modulated by the appropriate audio frequency signals and which difference signal may appear in the video circuits. It is therefore necessary to attenuate this difference signal of 4.5 MHz.

This 4.5 MHz. difference signal represents an undesirable signal as far as succeeding video and color processing circuits are concerned. If the 4.5 MHz. appears in the luminance channel, it may be displayed as a video component unrelated to the desired picture. If the 4.5 MHz. signal is too large in amplitude, it may cause overloading of subsequent video signal amplifier stages with a resultant distortion of the desired video signal. Even more seriously, if the undesired 4.5 MHz. signal is allowed to reach the chroma-processing portions of the receiver, it can combine with a regenerated 3.58 MHz. color subcarrier to produce an undesired 920 KHz. difference signal in the color channel.

BRIEF DESCRIPTION OF THE PRIOR ART

Because of the unwanted and detrimental effects of the 4.5 MHz. difference signal in the luminance and chrominance portions of a receiver, it is frequently customary to include a trap circuit directly in the output of the video detector to attenuate the 4.5 MHz. difference signal. In the conventional manner such a trap circuit would consist of a capacitor in parallel with a center tapped inductance. The center tap provides a path from the inductance to ground by means of a compensating resistance. It is well known in the video system art that when this compensating resistor is made equal to one-fourth the equivalent parallel resistance which represents the losses at the resonant frequency of the center tapped inductance and the capacitance, the attenuation at the trap frequency can be made essentially infinite. Since it is desired that the attenuation at 4.5 MHz. be large, it is possible that the desired signals which are contained within a band of between approximately 3 to 4.2 MHz. may also be attenuated by the trap circuit. This means that it is desirable that the attenuation at frequencies lower than 4.5 MHz. be decreased as rapidly as possible so that the band of frequencies representing the desired signals between 3 and 4.2 MHz. be effectively passed to the subsequent stages. It is customary for the response of the intermediate frequency amplifiers of a color television receiver to roll off in the region of IF frequencies corresponding to video frequencies between 3 and 4.2 MHz. especially if 41.25 MHz. traps are utilized. It would hence be desirable to increase the transmission of the video signals between 3 and 4.2 MHz. in the luminance and chrominance circuits.

It is accordingly one object of the present invention to effectively attenuate a 4.5 MHz. difference signal in the video circuits of a television receiver.

It is another object of the present invention to emphasize 3 to 4.2 MHz. signals relative to a 4.5 MHz. sound signal in the video circuits of a television receiver.

It is a further object of the present invention to increase the transmission of signal frequencies between 3 and 4.2 MHz. relative to the transmission of low video frequencies in the luminance and chrominance circuits of a receiver, while at the same time effectively attenuating a 4.5 MHz. sound signal in video circuits of a television receiver.

BRIEF SUMMARY OF THE INVENTION

The above and other objects are obtained by the circuit of the present invention which attenuates the undesired 4.5 MHz. signals that may appear at the output of the video detector without attenuating but rather emphasizing the lower frequency video signals. According to this invention a trap is located after the video detector and forms an element of an emitter follower stage that processes video signals generated at the detector.

BRIEF DESCRIPTION OF THE DRAWINGS

The above as well as further objects and advantages of the present invention will become apparent from the following description including the drawings wherein.

Figure 2:
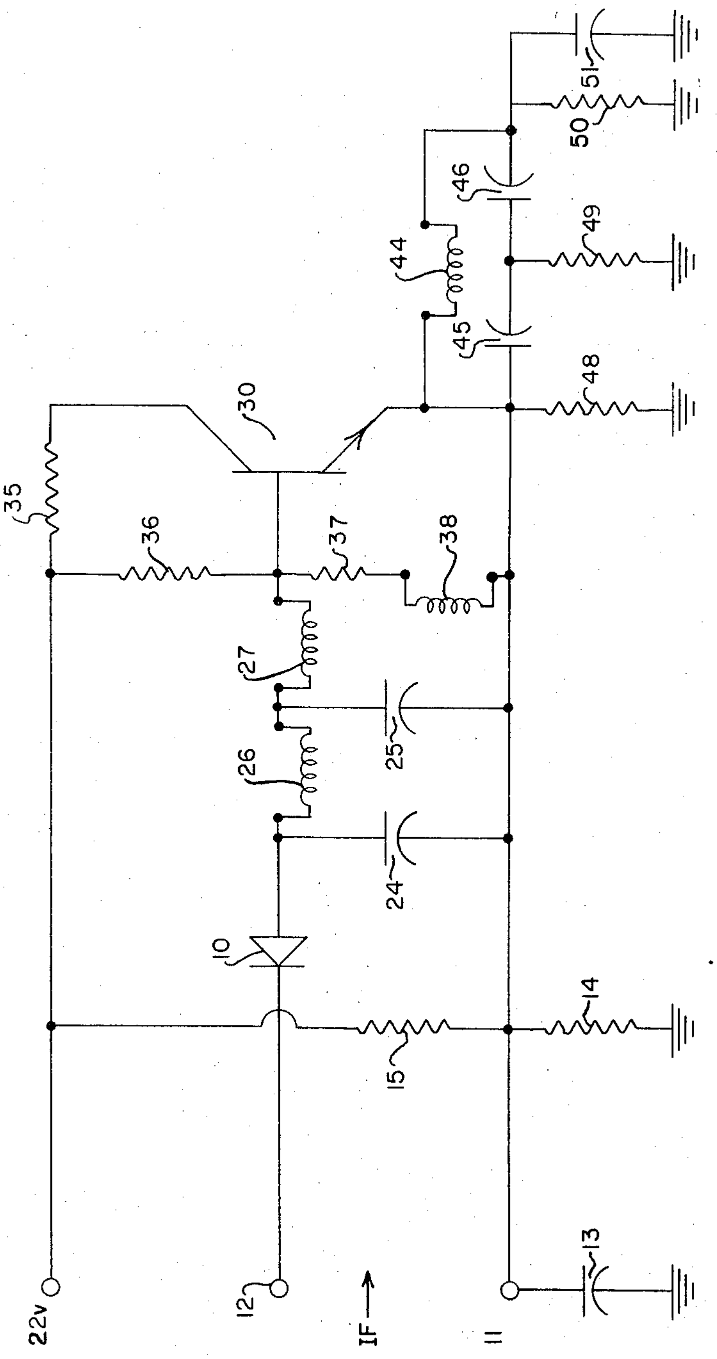
FIG. 2 shows the circuit arrangement of the present invention embodying a 4.5 MHz. trap.

In order, therefore, to increase the response between 3 and 4.2 MHz. while at the same time adequately attenuating the 4.5 MHz. sound signal, the improved circuit embodying the invention and shown in FIG. 2 is provided.

In the circuit of FIG. 2, the output of an intermediate frequency amplifier containing signals representative of video signals and which may contain a signal representative of a 4.5 MHz. sound signal is applied between terminals 11 and 12. Resistances 14 and 15 as well as capacitance 13 serve to form a constant bias source to bias the point 11 above ground potential. The signal applied between terminals 11 and 12 is processed through a detector consisting of diode 10 and a low pass filter consisting of capacitances 24 and 25 and inductances 26 and 27. The filter attenuates intermediate and higher frequencies. The inductance 38 as well as resistance 37 serve to provide a load for the detector circuit. The video output of the detector is essentially placed at the base of transistor 30. The transistor receives base bias current from a suitable DC power supply by means of resistance 36 and the collector DC bias level of transistor 30 is maintained by means of resistor 35.

The video output of the detector circuit is applied between the base and emitter of transistor 30. A 4.5 MHz. trap circuit consisting of the untapped coil 44 in conjunction with the two capacitors 45 and 46 and the compensating resistance 49 is placed at the output of transistor 30 in an emitter follower configuration. Resistance 50 and capacitance 51 form a load for the trap circuit and represent the input impedance of the subsequent stages of the receiver. In the circuit of FIG. 2, the output resistance of the emitter follower, as is well known, is low and may be taken to be about 50 ohms.

In order to cause the frequency of the response maximum of the passband of the trap to fall near the desirable value of about 4.3 MHz., the trap tuned capacitance is set at a value of about 235 picofarads which represent a series combination of capacitances 45 and 46. This is approximately double the typical value of the capacitances encountered when the trap is placed between the detector and the input of the transistor 30 as found in the prior art. The trap inductance in this case may be decreased proportionately to maintain the trap frequency at about 4.5 MHz. and the approximate overall video response of this circuit is shown in FIG. 3.

Figure 1:
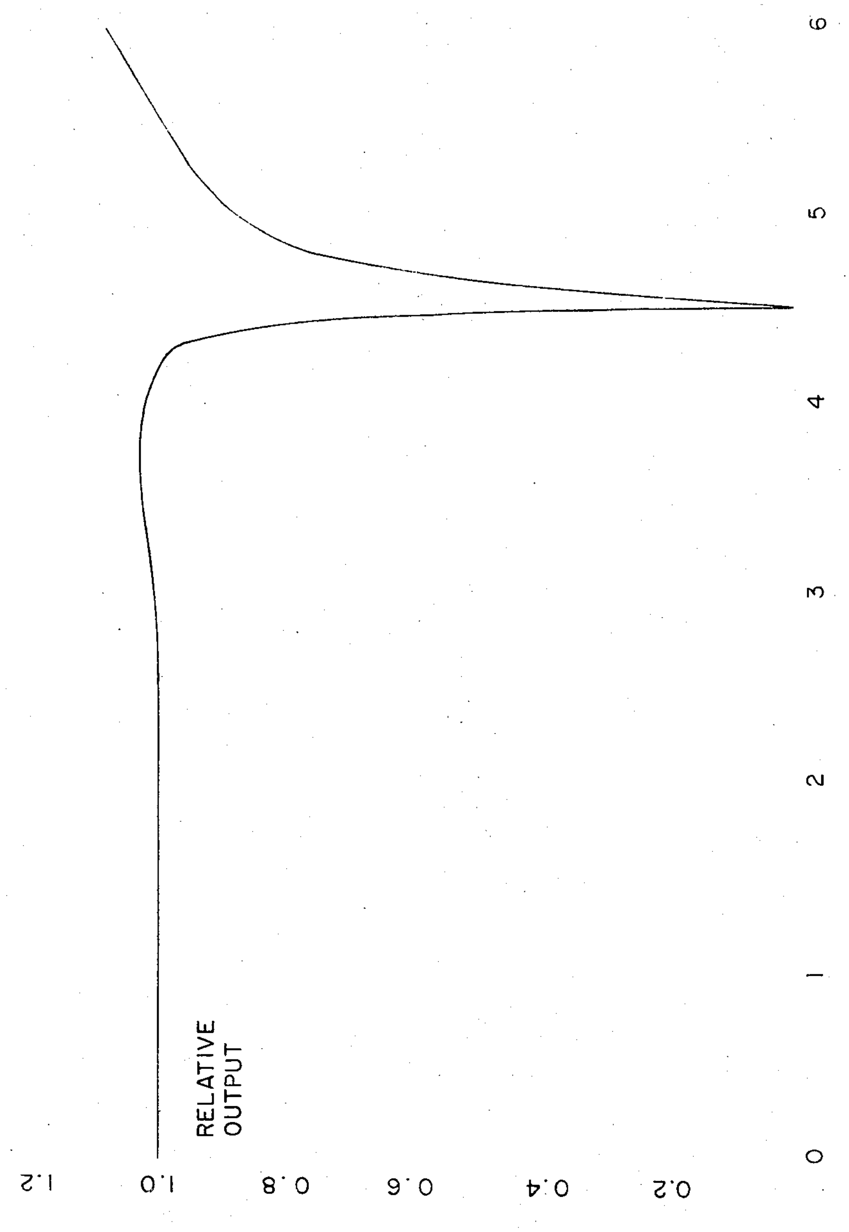
FIG. 1 shows the frequency response characteristics of a trap utilized by the prior art for attenuating 4.5 MHz. signals.
Figure 3:
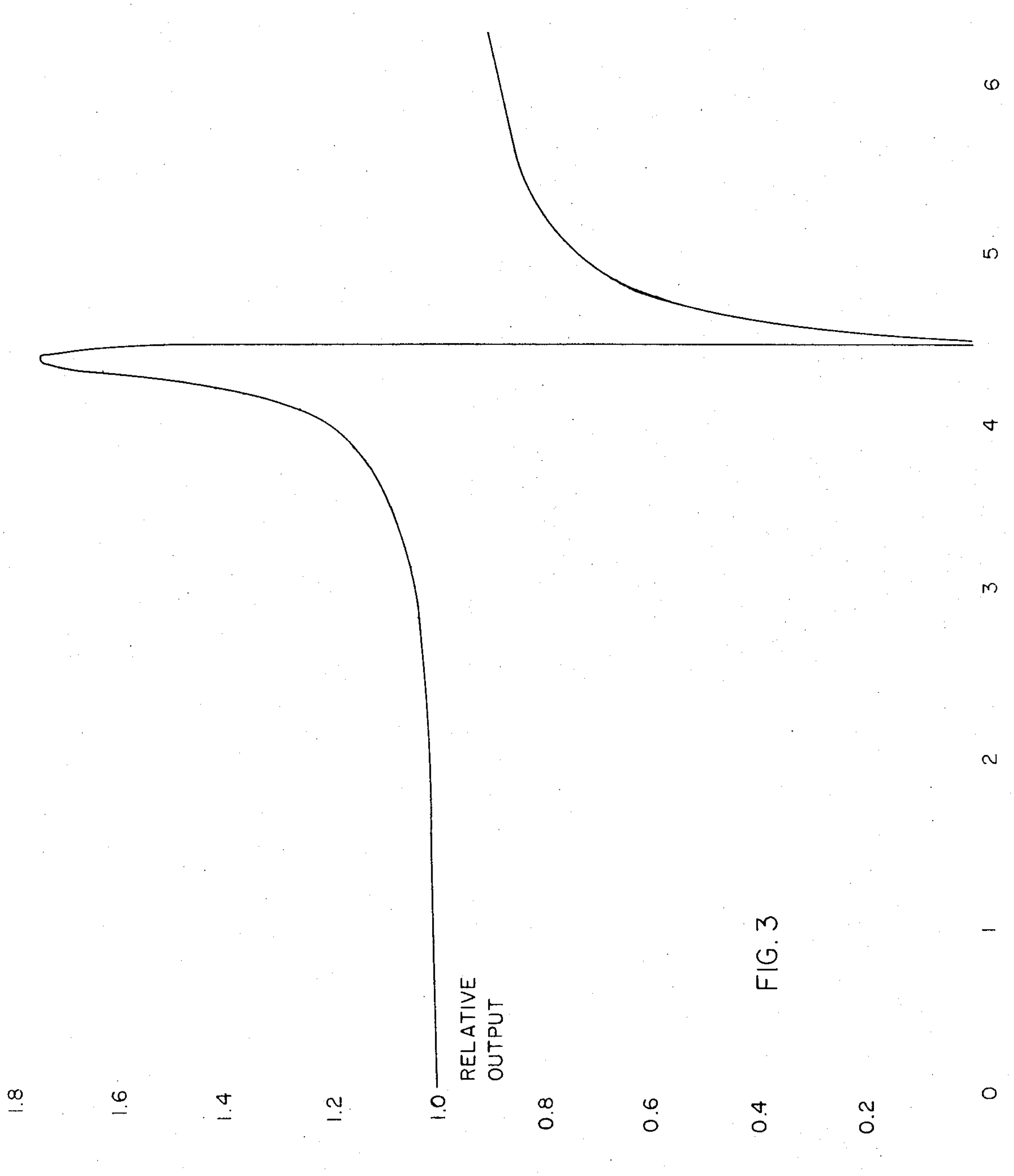
FIG. 3 shows the frequency response characteristic of the circuit shown in FIG. 2. Referring to the drawings, the frequency response of the typical prior art trap circuit used in conjunction with a video detector and subsequent video stages is shown in FIG. 1. The conventional circuitry, well known in the art, and leading to a response curve shown in FIG. 1, includes a trap for the 4.5 MHz. sound signal which immediately follows the video detector. The trap consists of a capacitor in parallel with a center tapped inductance, the center tap of which is connected to ground by means of a compensating resistance. For such a prior art circuit, it can be seen in FIG. 1 that for 4.5 MHz. the sound carrier is well attenuated. Referring to the same figure, a slight rise occurs in the response in the region between 3.0 and 4.2 MHz. However, this slight rise in response relative to that obtained at the zero frequency and low frequency video signal frequencies is only about 3 percent and the maximum occurs at approximately 3.7 MHz.

The improvement in performance obtained by the circuit of FIG. 2 is apparent when FIG. 1 and FIG. 3 are compared. FIG. 1 shows a slight rise in response in the region between 3.0 and 4.2 MHz. which rise is approximately a 3 percent increase over the zero frequency values. The maximum rise for FIG. 1 occurs at about 3.7 MHz. In FIG. 3, however, relative response of the improved circuit is seen to have an increase of 75 percent above the response at zero frequency and the maximum rise occurs at approximately 4.3 MHz.

In both the prior art circuits and the circuit of the invention as shown in FIG. 2 losses in the trap inductance and the presence of the trap compensating resistance may cause the response near the trap frequency not to be as high or as narrow as indicated in FIG. 3 since these curves have been obtained by computation derived from approximated circuit equivalents.

Since it may be desirable to vary the emphasis of the response in the neighborhood of 4.2 MHz. as indicated by the response curve of FIG. 3, the amount of emphasis may be altered by changing the value of the load resistance 50 in the circuit of FIG. 2. If it happens that the actual load to be connected in the position of resistance 50 is a smaller resistance than that required for the desired amount of emphasis, then a second emitter follower stage may be interposed between the load and the output of the trap. The required amount of resistance and capacitance may be added in parallel with the input of a subsequent emitter follower, as is known in the art, to achieve the desired emphasis of frequencies between 3 and 4.2 MHz.

In addition to the advantages presented by the circuit of this invention, that is, providing greater emphasis of frequencies lower than but close to the trap frequency, the circuit of this invention has a further advantage which, like the above, results from the lower video signal source impedance obtained by the use of an emitter follower as compared with the video detector as a video signal source impedance. It is possible in the new circuit of this invention to connect the trap compensating resistor to the common point of two series connected capacitors rather than to the center tap on a trap inductance. It is an advantage to avoid using tapped inductances because of their greater complexity and greater cost than untapped inductances. The need to use such devices is eliminated by the circuit of this invention.

It will be apparent to one skilled in the art that an improved circuit has been described which effectively traps the 4.5 MHz. sound frequency from the signals applied to the luminance and chrominance circuitry of a television receiver. It will also be apparent that this improved circuitry effectively increases the response of a detector and emitter follower stage with respect to those signals lying between 3 and 4.2 MHz. while at the same time reducing the 4.5 MHz. difference signal. The circuit further has allowed elimination of a center tap inductance found in trap circuits in the prior art, thus decreasing the cost of manufacturing such trap circuitry. Further, because the trap circuit is located in an emitter follower stage and because of the low impedance of an emitter follower, the frequency response characteristic of the trap may be controlled by controlling the input impedance of the following stages which are supplied by the output of the trap circuit. This adds an adjustability feature not encountered in the prior art while at the same time giving improved response to the signals less than the trap frequency.

While having shown and described a new and improved trap circuit according to this invention in an embodiment thereof, it will be apparent to those skilled in the art that various modifications and changes may be made in the circuitry herein described without departing from the spirit and scope of this invention as defined in the appended claims.

What is claimed as new and desired to be secured by letters patent of the United States is:

1. In a color television receiver having a video detector circuit for producing a demodulated signal by demodulating an intermediate frequency signal applied to said detector, said intermediate frequency signal comprising a relatively wideband video signal and an audio signal and said demodulated signal containing a luminance signal, a chrominance signal and a difference signal having a frequency which is the difference between the intermediate frequency of said video signal and the intermediate frequency of said audio signal, an improved video signal circuit comprising:

an emitter follower circuit connected to receive said demodulated signals; and a trap circuit for trapping said difference signal at the emitter of said emitter follower circuit wherein the output of said trap circuit is connected to a load, said load, as seen by the output of said trap, being adjustable to emphasize a relatively narrow band of preselected video signal frequencies less than the frequency of said difference signal.

2. The circuit of claim 1 wherein said trap circuit has an input and an output, said input being connected to the emitter of said emitter follower circuit and wherein said trap circuit further comprises:

first and second capacitances connected in series and having a terminal mediate said capacitances;

an inductance connected in parallel with said series connection of said capacitances: and a compensating resistance connected between said terminal and a common point.

3. In a television receiver having a detector circuit for detecting relatively broad band video signals from intermediate frequency signals representing video and audio signals, a circuit for attenuating a difference signal which has a frequency which is the difference between the frequencies of said intermediate frequency signals comprising:

a transistor having an input signal derived from said detector output and applied to the base-emitter junction thereof;

a trap circuit having an input and an output and comprising an inductance, a first capacitance, a second capacitance and a resistance, said capacitances connected in series and having a terminal mediate said capacitances, said inductance connected across the series connection of said capacitances and said resistance connected between said mediate terminal and a common terminal, said input of said trap circuit connected at the emitter of said transistor; and a load connected to the output of said trap, said load, as seen by the output of said trap, being adjustable to emphasize a relatively narrow band of preselected video signal frequencies less than the frequency of said difference signal.

* * * * *